(12) United States Patent
Aoki et al.

(10) Patent No.: US 7,474,655 B2
(45) Date of Patent: Jan. 6, 2009

(54) RESTRICTING COMMUNICATION SERVICE

(75) Inventors: Kentaro Aoki, Sagamihara (JP); Yukinobu Moriva, Tokyo (JP); Izumi Kagawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 11/175,756

(22) Filed: Jul. 6, 2005

(65) Prior Publication Data

US 2006/0059552 A1 Mar. 16, 2006

(30) Foreign Application Priority Data

Sep. 6, 2004 (JP) ............................. 2004-258959

(51) Int. Cl.
*H04L 12/28* (2006.01)
(52) U.S. Cl. ........................ 370/389; 709/238; 709/244; 726/13; 370/422
(58) Field of Classification Search ................. 370/218, 370/231, 235, 245, 256, 395.54, 466, 908; 709/220, 222, 244, 245, 224, 232; 726/13, 726/11; 713/151, 154, 162
See application file for complete search history.

(56) References Cited

U.S. PATENT DOCUMENTS 6,874,147 B1 * 3/2005 Diamant .................... 719/328
6,971,044 B2 * 11/2005 Geng et al. ................... 714/11
7,093,288 B1 * 8/2006 Hydrie et al. ................. 726/13
7,174,390 B2 * 2/2007 Schulter et al. ............. 709/245
7,231,430 B2 * 6/2007 Brownell et al. ............ 709/218

FOREIGN PATENT DOCUMENTS

| JP | 7-281980 A | 10/1995 |
| JP | 11-136274 A | 5/1999 |
| JP | 2002-318739 A | 10/2002 |
| JP | 2003-348113 A | 5/2003 |
| JP | 2003-273936 | 9/2003 |
| JP | 2003-289338 A | 10/2003 |

* cited by examiner

*Primary Examiner*—Chirag G Shah
*Assistant Examiner*—Otis L Thompson, Jr.
(74) *Attorney, Agent, or Firm*—David R. Irvin; Shimokaje & Associates, P.C.

(57) ABSTRACT

In response to a command to restrict a communication service for a computer, a countermeasures apparatus replaces the communication address of a second computer, which has been stored in a first computer, with the communication address of the countermeasures apparatus, and replaces a communication address of the first computer, which has been stored in the second computer, with the communication address of the countermeasures apparatus. Accordingly, the countermeasures apparatus acquires a packet from the first computer to the second computer and determines whether this acquired packet is to be transmitted to the second computer.

4 Claims, 6 Drawing Sheets

| TRANSFER PACKET | DISCARD PACKET | EXAMPLE OF EFFECT |
|---|---|---|
| PROTOCOL: HTTP<br>DESTINATION: DISTRIBUTION SITE (DISTRIBUTION SERVER) OF AGENT SOFTWARE | OTHER THAN THE LEFT | USE OF NETWORK CAN BE PREVENTED UNTIL AGENT SOFTWARE IS INSTALLED |
| PROTOCOL: HTTP<br>DESTINATION: UPDATE SITE (DISTRIBUTION SERVER) OF VIRUS DEFINITION FILE | OTHER THAN THE LEFT | DEFINITION FILE CAN BE UPDATED WHILE INFECTED PACKET IS DISCARDED |
| PROTOCOL: HTTP<br>DESTINATION: DISTRIBUTION SITE (DISTRIBUTION SERVER) OF SECURITY PATCH | OTHER THAN THE LEFT | USE OF NETWORK CAN BE PREVENTED UNTIL PATCH IS INSTALLED |
| OTHER THAN THE RIGHT | PORT NUMBER: PORT NUMBER OF PROHIBITED SOFTWARE OR GAME | USE OF NETWORK BY PROHIBITED SOFTWARE OR GAME CAN BE PREVENTED |

RESTRICTING COMMUNICATION SERVICE

FIELD OF THE INVENTION

The present invention relates to apparatus, methods, and computer program products for restricting communication service between computers.

BACKGROUND

Along with development of network technologies in recent years, computers serving as client terminals have been connected to various networks. Accordingly, damages by computer viruses and the like and damages caused by intrusion of hackers and crackers have been increasing. Thus, security measures for client terminals have become important.

Moreover, execution of prohibited software within a subnetwork by a client terminal can make subnetwork security vulnerable. Moreover, sometimes it may be desirable to limit the communication services that are available to specific computers. For example, in an educational institution it may be desirable to restrict communication services available to students that are not suitable from an educational standpoint. In addition, minimizing unnecessary connections makes it possible to use network resources more effectively. Thus, it may be preferable that a network administrator or a service provider be able to restrict communication services accessible to computers connected to a subnetwork, in order to control access to servers by computers lacking security measures, the use of prohibited software, and the like.

A computer lacking security measures may require the installation of a virus pattern file or a security patch provided by a server over a local area network (LAN). Here, such a computer is called a "computer to be controlled." However, in this situation the computer to be controlled lacks security measures. Thus, it is preferable to be able to restrict the availability of all usual communication services using the server and the LAN, in order to prevent damage caused by virus and worm infection, and the like. Specifically, for the computer to be controlled, it is desirable that only the communication services needed for security measures be executed, and that other communication services irrelevant to the security measures, such as access to files and use of server applications, be restricted.

Restrictions on communication services can be provided by a firewall by capturing packets that flow between a PC (personal computer) and a server, and examining the contents of the packets (see, for example, Japanese Published Unexamined Patent Application No. 2003-273936). Japanese Published Unexamined Patent Application No. 2003-273936 teaches that packets may be filtered by a firewall between a terminal and a central server.

If all communications of a computer to be controlled pass through the firewall, communication services of the computer to be controlled can be restricted using the method of Japanese Published Unexamined Patent Application No. 2003-273936. However, when the computer to be controlled is connected inside a subnetwork such as LAN behind the firewall, so that communication is completed within the network without passing through the firewall, it is not possible to restrict a communication service in this way.

Another way to restrict communication services is by using network devices called layer 3 switches and layer 7 switches. The layer 3 switch and the layer 7 switch may be, for example, switches capable of controlling the destination of a packet according to an application level protocol. Thus, a specific communication service can be restricted by permitting or blocking communication with a server by acquiring a packet from a computer to be controlled, and recognizing the packet accordingly. However, this method of restricting communication service requires the use of layer 3 or layer 7 switches for all the switches or hubs throughout a subnetwork.

In principle, an intelligent switch could be used; however, an intelligent switch can only block a packet, and cannot restrict a communication service.

Further, it is preferable that an administrator of the subnetwork be able to restrict communication service at any arbitrary time. For example, when a new virus circulates, it is preferable that a communication service be restricted again, even though security measures have been fully implemented previously and the communication service is not restricted. It is preferable to be able to remove the restriction quickly, once security measures for the new virus are fully implemented.

Thus, as described above, there is a need for a way of restricting communication services of computers behind firewalls.

SUMMARY

The present invention provides a countermeasures apparatus, which is capable of communicating with a plurality of computers including a first computer and a second computer. The apparatus may include: communication address replacing means for replacing a communication address of the second computer, which has been stored in the first computer, with a communication address of the countermeasures apparatus, and for replacing a communication address of the first computer, which has been stored in the second computer, with the communication address of the countermeasures apparatus, in response to a command to start restrictions on a communication service; first packet acquisition means for acquiring a packet from the first computer to the second computer; second packet acquisition means for acquiring a packet from the second computer to the first computer; and first determination means for determining whether or not the packet which the first packet acquisition means has acquired is to be transmitted to the second computer, by which a communication service between the first computer and the second computer is restricted.

According to the present invention, the communication address replacing means of the countermeasures apparatus, in response to the command to start restrictions on the communication service, may replace the communication address of the second computer, which has been stored in the first computer, with the communication address of the countermeasures apparatus and may replace the communication address of the first computer, which has been stored in the second computer, with the communication address of the countermeasures apparatus. In addition, the first packet acquisition means of the countermeasures apparatus may intercept or acquire a packet from the first computer to the second computer, and the second packet acquisition means of the countermeasures apparatus may intercept or acquire a packet from the second computer to the first computer. The first determination means of the countermeasures apparatus may determine whether or not the packet acquired by the first packet acquisition means is to be transmitted to the second computer. Thus, the communication service between the first and second computers may be restricted.

Therefore, according to the present invention, an apparatus or a method can be provided, which is capable of restricting a communication service of a computer to be controlled, the communication service being completed within a subnetwork without passing through a firewall, and which is capable of restricting the communication service of the computer to be controlled at any time desired by an administrator.

BRIEF DESCRIPTION OF THE DRAWINGS

For a more complete understanding of the present invention and the advantages thereof, reference is now made to the following description taken in conjunction with the accompanying drawings.

DETAILED DESCRIPTION

With reference to the drawings, an exemplary embodiment of the present invention will be described below.

Figure 1:
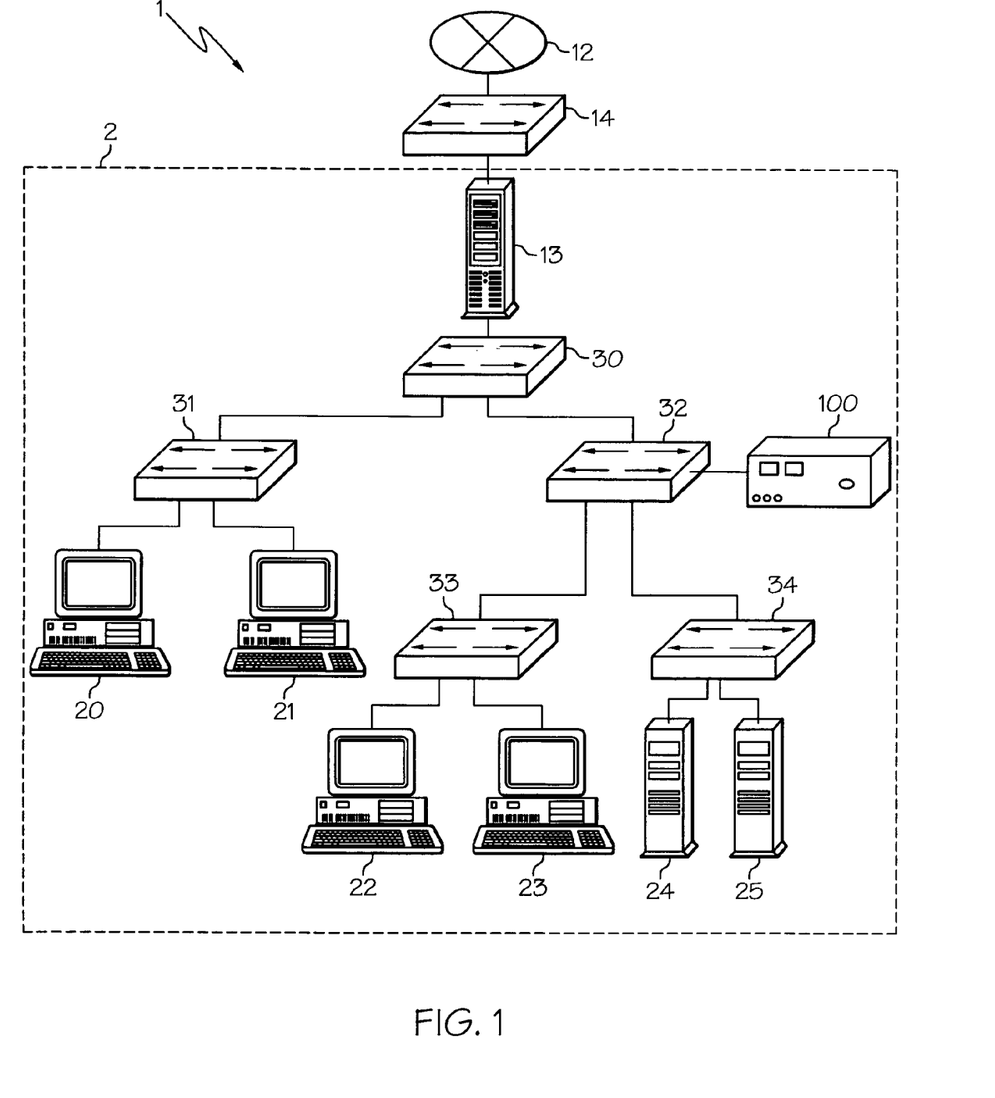
FIG. 1 shows a hardware configuration of a communication service control system according to the present invention.

As shown in FIG. 1, a communication service control system 1 includes: a plurality of computers to be controlled 20 to 23; servers 24 and 25 such as file servers; networking equipment 30 to 34 connected to the computers and the servers; the Internet or an external network 12; a firewall 13 providing communication security from the Internet or the external network 12; a router 14; and a countermeasures apparatus 100 for controlling communication service.

The computers to be controlled 20 to 23 may be personal computers or personal digital assistants (PDAs) as computers of client terminals using this system. Specifically, each of the computers to be controlled 20 to 23 may include: display means such as a CRT display and a liquid crystal display; input means such as a keyboard, a numeric keypad and a mouse; storage means such as a hard disk and a memory; control means such as a CPU; and communication means such as a network card connected to the networking equipments 30 to 34.

The computers to be controlled 20 to 23 are computers (first computers) of which communication services are restricted by the communication service control system 1. Therefore, according to the communication service control system 1, for example, the communication service between the computers to be controlled 20 and 21 may be restricted on the condition that the countermeasures apparatus 100 sends out a command to start restrictions on the communication service. Alternatively, the communication service between the computer to be controlled 20 and the server 24 may be restricted. Moreover, a communication service between the computer to be controlled 20 and a server connected through the Internet may be restricted.

The computers to be controlled 20 to 23 may be, for example, computers that lack sufficient measures against viruses, or computers that are not permitted to connect to a subnetwork 2. Moreover, the computers to be controlled 20 to 23 may be computers in which prohibited software using an unauthorized communication service is installed. Such computers to be controlled 20 to 23 may become a threat to the subnetwork 2. Thus, it may be preferable to an administrator of the subnetwork that a particular communication service be restricted.

The servers 24 and 25 may be servers such as file servers and application servers, and may be, for example, servers (second computers) which are accessed by the computer to be controlled 20. In the communication service control system 1, communication services between the computers to be controlled 20 to 23 and the servers 24 and 25 are restricted. As described above, not only the communication services between the computer to be controlled 20 and the servers 24 and 25 but also the communication services provided between the computers to be controlled 20 to 23 may be restricted. For example, the communication service between the computer to be controlled 20 (a first computer) and the computer to be controlled 21 (a second computer) may be restricted.

The networking equipment 30 to 34 may be devices which relay connections between the computers to be controlled 20 to 23, and may be normal switches, hubs, layer 3 switches, and the like. Although the countermeasures apparatus 100 is connected to the networking equipment 32, restrictions on the communication service may be performed for the computers to be controlled 20 and 21 that are connected to the networking equipment 31 which is not directly connected to the countermeasures apparatus 100.

The Internet or the external network 12 may be an external network and may be, for example, a communication line network through which the servers 24 and 25 are accessed from the outside. The firewall 13 may be a computer for restricting communication services accessed by computers through the Internet or the external network 12. The subnetwork 2 is a network lower than the firewall 13 and the networking equipment 30 (on the side where the computers to be controlled are connected).

The router 14 is networking equipment that connects an internal network including the subnetwork 2 and the Internet or the external network 12. The router 14 divides the Internet or the external network 12 from the subnetwork 2.

The countermeasures apparatus 100 may be connected to the networking equipment 32 in the subnetwork 2, thereby restricting the communication services between the computers to be controlled 20 to 23 in the subnetwork 2. Specifically, the communication services of the computers to be controlled 22 and 23, which are connected to nodes lower than the networking equipment 32 directly connected to the countermeasures apparatus 100, are restricted. In addition, the countermeasures apparatus 100 may restrict the communication services of the computers to be controlled 20 and 21, which are connected through the networking equipments 30 and 31.

Figure 2:
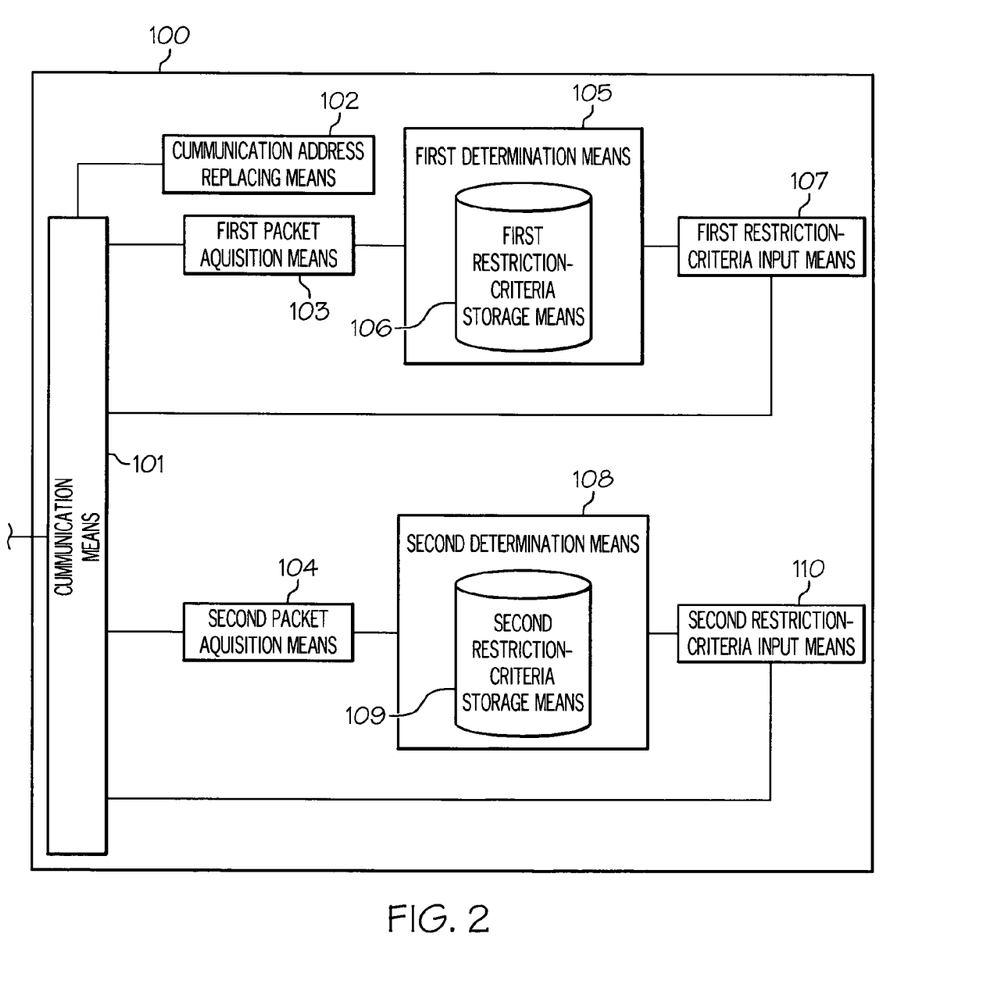
FIG. 2 shows a hardware configuration of a countermeasures apparatus.

As shown in FIG. 2, the countermeasures apparatus 100 may include: communication means 101 for connecting to the networking equipment 30 to 34; communication address replacing means 102 for replacing the communication addresses of the computers to be controlled 20 to 23; first packet acquisition means 103 for intercepting or acquiring packets of the computers to be controlled 20 to 23, of which the communication addresses are replaced; first determination means 105 for determining whether the acquired packets are to be discarded or to be permitted to pass; first restriction-criteria input means 107 for receiving input of criteria for determining whether the packets are discarded or permitted to pass; and first restriction-criteria storage means 106 for storing the determination criteria.

The countermeasures apparatus 100 may further include: second packet acquisition means 104 for acquiring packets of the servers 24 and 25 or of the computers to be controlled 20 to 23; second determination means 108 for determining whether the acquired packets are to be discarded or to be permitted to pass; second restriction-criteria input means 110 for receiving input of criteria for determining whether the packets are discarded or permitted to pass; and second restriction-criteria storage means 109 for storing the determination criteria.

The communication means 101 is for connecting to the networking equipment 30 to 34, and may be, for example, a network interface card (hereinafter referred to as a "NIC"). The NIC may include an identification address for identifying the communication means 101, the address being called a MAC (media access control) address.

The communication address replacing means 102 replaces the communication addresses (for example, MAC addresses) of the computers to be controlled 20 to 23 (hereinafter referred to as "first computers"), of which communication services are restricted, with the communication addresses of the servers 24 and 25 (hereinafter referred to as "second computers") which provide the first computers with the communication services.

The communication address replacing means 102 may transmit an Address Resolution Protocol (ARP) request or an ARP reply to the first and second computers in response to a command to start restrictions on the communication services, the command being sent out by the administrator of the sub-network 2. According to the ARP request or the ARP reply, the MAC addresses of the second computers, which have been stored in the first computers, are replaced (overwritten) with a MAC address of the countermeasures apparatus 100, and the MAC addresses of the first computers, which have been stored in the second computers, are replaced (overwritten) with the MAC address of the countermeasures apparatus 100.

The first packet acquisition means 103 acquires packets or frames which are transmitted from the first computers to the second computers. The communication addresses of the second computers, which have been stored in the first computers, are replaced with the communication address of the countermeasures apparatus 100 by the communication address replacing means 102. Thus, the countermeasures apparatus 100 acquires packets transmitted from the first computers to the second computers. The first packet acquisition means 103 is the means hereof for acquiring the packets transmitted from the first computers (a first packet acquisition step).

The first determination means 105 determines (a first determination step) which packets are to be permitted to pass (to be transmitted to the second computer), and which packets are to be blocked and discarded without being transmitted to the second computer, among the packets acquired by the first packet acquisition means 103.

The first restriction-criteria input means 107 receives criteria for determining whether the packets are permitted to pass or are discarded (a first restriction-criteria input step). Specifically, the administrator may input restriction-criteria data serving as criteria to be used for determinations by first determination means 105. One example of the criteria is that a packet using a communication service of prohibited software is blocked and discarded. The first restriction-criteria input means 107 may be an input device, such as a keyboard and a mouse, which receives input directly from the administrator. Moreover, in the case of receiving input of the criteria through the network, the first restriction-criteria input means 107 receives the data serving as criteria through the communication means 101 and stores the data in the first restriction-criteria storage means 106.

The first restriction-criteria storage means 106 stores the data serving as criteria for determining whether the packets are permitted to pass or are discarded (a first restriction-criteria storage step), the data being input by the first restriction-criteria input means 107.

The second packet acquisition means 104 acquires packets or frames which are to be transmitted from the second computers to the first computers. The communication address replacing means 102 has replaced communication addresses of the first computers, which had been stored in the second computers, with the communication address of the countermeasures apparatus 100. Thus, the countermeasures apparatus 100 acquires the packets to be transmitted from the second computers to the first computers. The second packet acquisition means 104 is the means for acquiring the packets transmitted from the second computers (a second packet acquisition step).

The second determination means 108 determines which of the packets acquired by the second packet acquisition means 104 is to be permitted to pass (to be transmitted to a first computer) and which of the packets is to be blocked and discarded without being transmitted to the first computer (a second determination step).

The second restriction-criteria input means 110 receives criteria for determining whether the packets are permitted to pass or are discarded (a second restriction-criteria input step). Specifically, for determination by the second determination means 108, the administrator may input data serving as criteria for the determination. The second restriction-criteria input means 110 may be an input device, such as a keyboard and a mouse, which receives input directly from the administrator. Moreover, in the case of receiving input of the criteria through the network, the second restriction-criteria input means 110 receives the data serving as the criteria through the communication means 101 and stores the data in the second restriction-criteria storage means 109.

The second restriction-criteria storage means 109 stores the data serving as the criteria for determining whether the packets are permitted to pass or are discarded (a second restriction-criteria storage step), the data being input by the second restriction-criteria input means 110.

Figure 3:
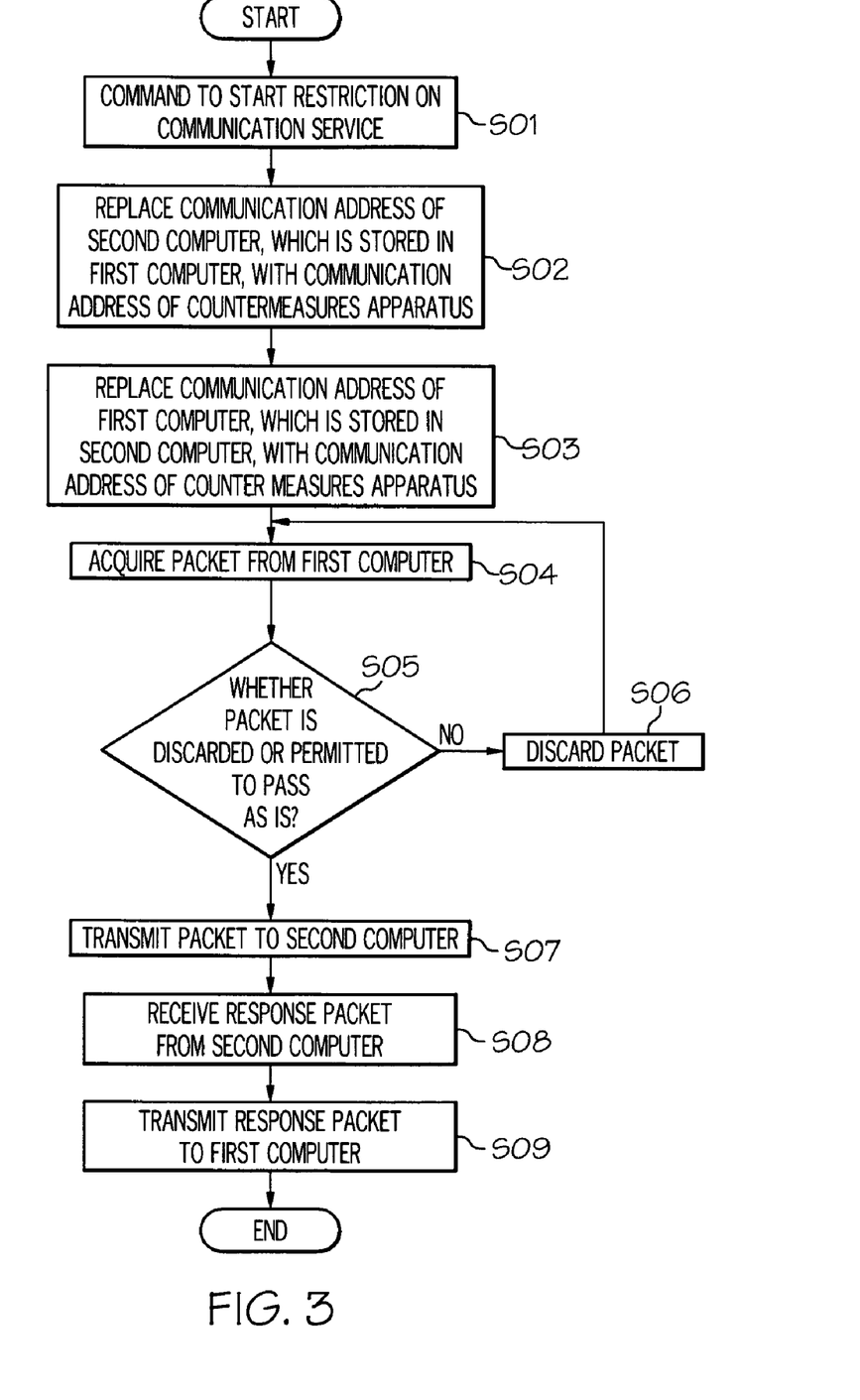
FIG. 3 is a flowchart showing operations executed by respective means of the countermeasures apparatus.

With reference to a flowchart of FIG. 3, description will be given of specific operations executed by the respective means of the countermeasures apparatus 100.

When the administrator wishes to restrict communication services between the computers connected within the subnetwork 2, the administrator sends the countermeasures apparatus 100 a command to start restrictions on the communication services (Step S01). Therefore, the command to start the restrictions on the communication services may include data concerning computers whose communication services are to be restricted, contents of the communication services, and servers providing the services to the computers.

The restrictions on the communication services may be started not only manually by the administrator but also automatically based on some kind of trigger detected in another system. For example, if there is another system which uses a resource register to detect a network connection of a computer that is not registered in the resource register, the restrictions on the communication services may be started automatically by receiving a command from the system.

In response to the command to start the restrictions on the communication services, the communication address replacing means 102 of the countermeasures apparatus 100 replaces the communication address (MAC address) of the second computer, which has been stored in the first computer (Step S02). The communication address replacing means 102 of the countermeasures apparatus 100 replaces the communication address (MAC address) of the first computer, which has been stored in the second computer (Step S03).

Because the communication address of the second computer, which has been stored in the first computer, has been replaced, the first packet acquisition means 103 of the countermeasures apparatus 100 acquires a packet transmitted to the second computer by the first computer (Step S04).

The first determination means 105 determines whether the packet acquired by the first packet acquisition means 103 is permitted to pass and be transmitted to the second computer, or the packet is blocked and discarded (Step S05). The first determination means 105 performs the determination based on criteria data stored in the first restriction-criteria storage means 106. When the first determination means 105 determines that the packet should be blocked and discarded, the first determination means 105 discards the packet (Step S06) and waits for the next packet to be received, with no communication services being performed based on the packet described above.

When the first determination means 105 determines that the packet is permitted to pass, the packet is transmitted to the second computer (Step S07). Meanwhile, the second packet acquisition means 104 of the countermeasures apparatus 100 receives a response packet for the packet described above from the second computer (Step S08). The received response packet is transmitted to the first computer (Step S09). Thus, a communication service based on the packet described above is implemented from the first computer to the second computer.

Figure 4:
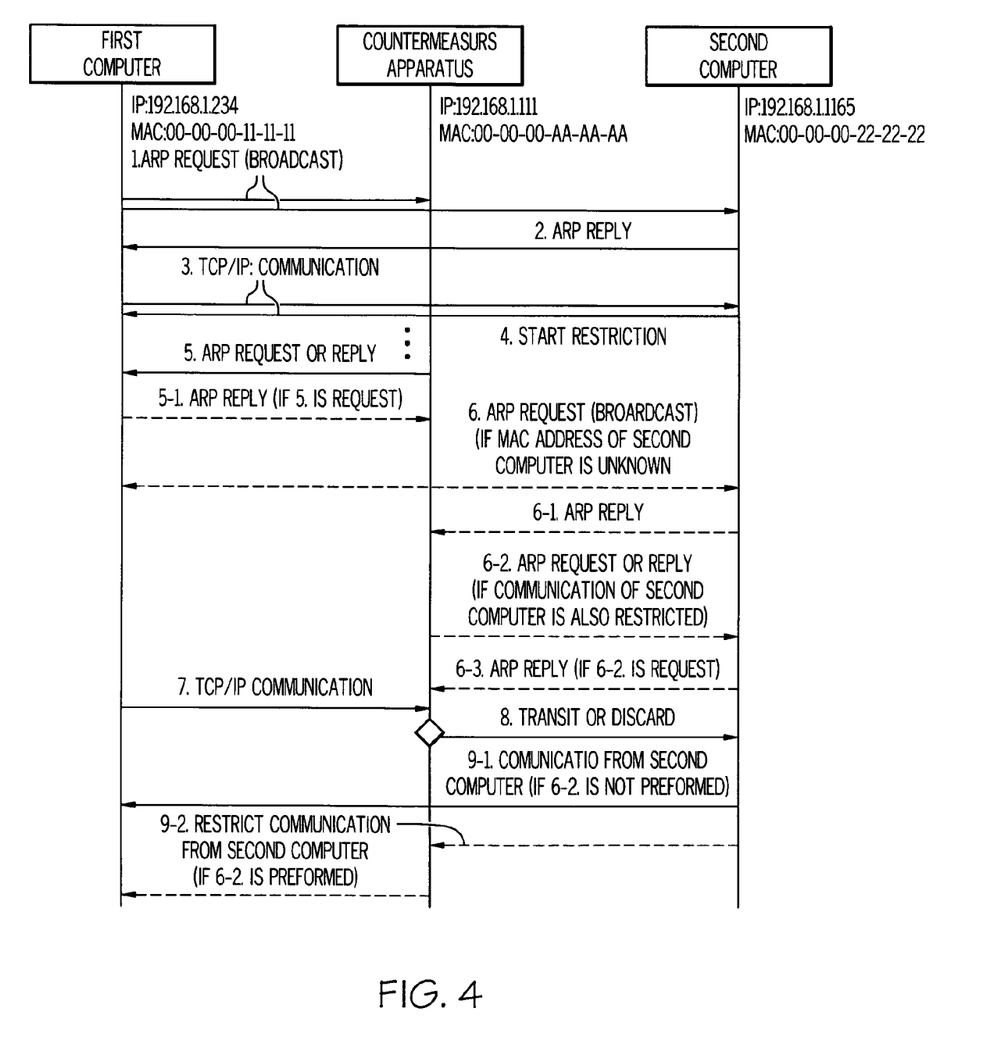
FIG. 4 is a sequence diagram showing a communication sequence performed by a first computer, a second computer, and the countermeasures apparatus.

Next, with reference to the sequence diagram of FIG. 4, description will be given of a communication sequence between the first computer, the second computer, and the countermeasures apparatus 100.

When the first computer is turned on, or when the first computer is connected to the subnetwork, the first computer transmits an ARP request (1) to all hosts within the same subnetwork (a broadcast communication). Specifically, the first computer uses the ARP request to request the communication address (MAC address) of the second computer. In response to the ARP request, the second computer transmits an ARP reply (2) to the first computer. Specifically, the MAC address of the second computer is transmitted to the first computer as the ARP reply. Thereafter, the first computer performs a usual communication, for example, a TCP/IP (transmission control protocol/Internet protocol) communication directly with the second computer.

As described above, the first and second computers may perform the TCP/IP communication (3) after the ARP reply is transmitted from the second computer. Meanwhile, a setting may be made such that a command to start restrictions on a communication service is issued before the TCP/IP communication is performed.

Specifically, when the first computer is turned on, or when the first computer is connected to the subnetwork for the first time, it might not be safe for the subnetwork to immediately connect the first computer to the second computer (for example, a server). In other words, the first computer could be a virus-infected computer or a computer lacking a security patch.

Accordingly, a setting may be made such that the next command to start restrictions on the communication service is issued to the countermeasures apparatus 100 immediately after the ARP reply is transmitted from the second computer. As described above, the timing of issuing the command to start restrictions on the communication service may be arbitrarily set by the administrator.

The command to start restrictions on the communication service may be issued by the administrator (4). The command may be issued at an arbitrary timing for the administrator of the subnetwork in cases, for example, where a new virus is spreading and a definition file for the virus needs to be installed, or where a new security patch needs to be installed into an operating system, or the like. Note that the command to start restrictions on the communication service is issued after the ARP reply is transmitted from the second computer.

When the command to start restrictions on the communication service is issued, the communication address replacing means 102 of the countermeasures apparatus 100 transmits an ARP request or an ARP reply to the first and second computers (5). If the first computer receives the ARP request, an ARP reply is transmitted to the countermeasures apparatus 100 (5-1). Based on the ARP request or the ARP reply, the MAC address (00-00-00-22-22-22) of the second computer, which has been stored in the first computer, is replaced with the MAC address (00-00-00-aa-aa-aa) of the communication means 101 of the countermeasures apparatus 100.

Sometimes the MAC address of the second computer may not be stored in the countermeasures apparatus 100. In this case, the countermeasures apparatus 100 transmits an ARP request to the second computer (6), and, in response to an ARP reply from the second computer (6-1), acquires and stores the MAC address of the second computer. Since this ARP request is transmitted through the broadcast communication, the ARP request is transmitted to not only the second computer but also the first computer. The MAC address of the second computer need not always be acquired upon an inquiry made by the ARP request. For example, if the countermeasures apparatus 100 has stored a frame in which the MAC address of the second computer is stored as a destination or a source, the MAC address may be extracted and acquired from this frame.

As described above, when the MAC address of the second computer, which has been stored in the first computer, is replaced based on the ARP reply, the countermeasures apparatus 100 becomes able to acquire a packet from the first computer to the second computer (7) and becomes able to restrict the communication service of the first computer (8). As a result, if the packet is transferred to the second computer, the second computer communicates with the first computer (9). Accordingly, if the communication service can be sufficiently restricted by discarding the packet from the first computer to the second computer by acquiring a packet from the first computer, there is no need to perform (6-2) and (6-3) in the sequence diagram. In this case, a packet from the second computer is transferred directly to the first computer without passing through the countermeasures apparatus (9-1).

Differing from the case described above, there is another case where the communication service can be restricted by acquiring a packet from the second computer to the first computer and determining the type of this packet by the countermeasures apparatus 100. In this case, (6-2) and (6-3) in the sequence diagram are performed.

The countermeasures apparatus 100 transmits the ARP request or the ARP reply to the second computer. Based on this ARP reply, the MAC address (00-00-00-11-11-11) of the first computer, which has been stored in the second computer, is replaced with the MAC address (00-00-00-aa-aa-aa) of the communication means 101 of the countermeasures apparatus 100. If the countermeasures apparatus 100 transmits the ARP request to the second computer, the ARP reply is transmitted to the countermeasures apparatus 100 (6-3). A packet transmitted from the second computer to the first computer is acquired by the countermeasures apparatus 100. Therefore, the second determination means 108 of the countermeasures apparatus 100 determines the type of this packet, and transfers the packet to the first computer or discards the packet (9-2).

Figure 5:
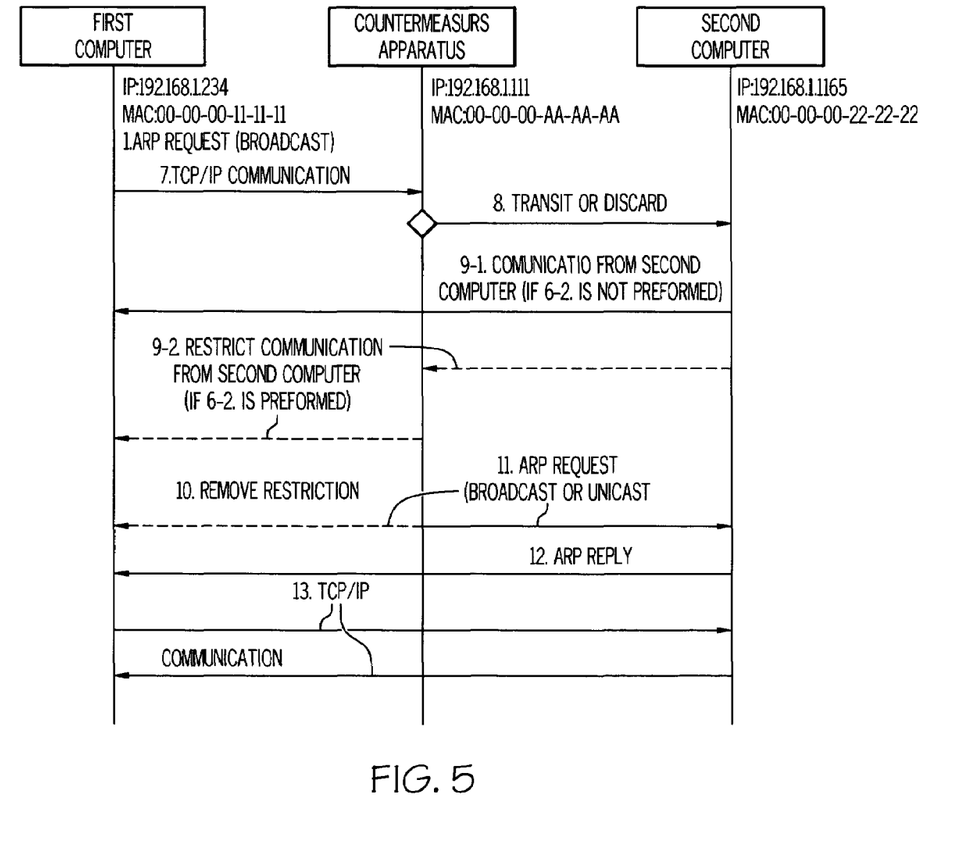
FIG. 5 is a sequence diagram showing a communication sequence performed by the first computer, the second computer, and the countermeasures apparatus.

The invention includes two methods for removing restrictions: a method for removing restrictions through a sequence of removing restrictions as shown in FIG. 5; and a method for removing restrictions on a communication service by changing transfer conditions of the countermeasures apparatus 100. Next, descriptions of these methods will be given.

In the latter method, the first determination means 105 of the countermeasures apparatus 100 makes a determination so as to transfer all packets to the second computer. Therefore, criteria are input from the first restriction-criteria input means 107 so as to transfer all the packets to the second computer. After the communication between the first and second computers has been discontinued, the MAC address of the countermeasures apparatus 100, which has been stored in the first computer, automatically disappears, and the first and second computers communicate directly with each other without going through the countermeasures apparatus 100.

The former method will be described with reference to FIG. 5. Based on a command to remove restrictions (10), an ARP request is transmitted from the countermeasures apparatus 100 to the second computer (11). This ARP request is a request for a MAC address of the second computer. This ARP request is transmitted through a broadcast or unicast communication by using an ARP sender IP address as an IP address of the first computer and by using an ARP sender MAC address as a MAC address of the first computer. However, a source address of a packet is not an address of the first computer. This is because a packet of an ARP reply (12) to the ARP request described above is not delivered to the first computer due to a switch between the first and second computers.

The ARP reply to the ARP request described above is transmitted from the second computer to the first computer (12). At this point, the MAC address of the second computer, which has been stored in the first computer, is rewritten. Specifically, the MAC address of the countermeasures apparatus 100, which has been stored as the MAC address of the second computer, is replaced with the original MAC address of the second computer. Furthermore, the MAC address of the countermeasures apparatus 100, which has been stored in the second computer as the MAC address of the first computer, is replaced with the original MAC address of the first computer. By replacing the MAC addresses, the first and second computers become able to communicate directly with each other, and removal of the restrictions on the communication service is finished (13).

Usually, in Ethernet (registered trademark) communication, a frame is transmitted to a destination based on a MAC address. Since a plurality of switches existing on a communication pathway store which MAC address exists beyond which port, the frame reaches the destination through these switches. If networking equipment relies on hubs rather than switches, the frame is sent out to all ports. Thus, the frame reaches other hosts as well. However, if a destination does not coincide with a MAC address of its own, this frame is discarded, and only an original destination host receives this frame.

Since the countermeasures apparatus 100 including the MAC address (00-00-00-aa-aa-aa) receives the frame described above, only the countermeasures apparatus acquires a frame transmitted from the first computer, and the second computer does not receive this frame.

As described above, after the MAC addresses have been replaced, all communication packets from the first computer to the second computers are transmitted through the countermeasures apparatus 100. Therefore, the countermeasures apparatus 100 examines each of these communication packets, and determines, based on a type of the packet, whether the packet is transferred to the second computer or blocked and discarded. Here, the types of the packets are classified according to, for example, a destination IP address of a packet, a port number of a TCT/IP, a protocol, and the like.

When the type of the packet to be transferred or discarded is determined based on specification of a communication to be restricted. As the case where the administrator of the subnetwork restricts a communication service for the first computer, for example, the following is conceivable.

A computer that is not approved to use the subnetwork may be prohibited from using a communication service other than the communication service needed to apply for use of the subnetwork. For a computer which has not yet been registered in the subnetwork, it is preferable, from the viewpoint of security, to permit the computer to use the communication service after application and registration for the subnetwork use are completed. Accordingly, the first determination means 105 may determine whether the packet is transferred or discarded so as to permit only the communication service concerning the application for use of the subnetwork, and so as to prohibit other communication services.

As an example, consider a case where the first computer applies for use of the subnetwork by obtaining agent software through communication beyond the subnetwork, and by installing and executing the agent software thus obtained. In such a case, it is preferable that other communication services irrelevant to the agent software are blocked. Specifically, a communication address (MAC address) of the router 14, which has been stored in the first computer, is replaced with a communication address of the countermeasures apparatus 100. Thus, a packet from the first computer is acquired by the countermeasures apparatus 100. Consequently, the countermeasures apparatus 100 is enabled to determine the type of the packet, and to restrict the communication service from the first computer to the second computer.

HTTP (hyper text transfer protocol) may be used as the protocol when the first computer obtains the agent software through the Internet (the communication beyond the subnetwork). First, the first computer requests a server on the Internet to transmit the agent software. The first computer transmits a packet using HTTP protocol requesting the transmission. This packet is addressed to a distribution site of the agent software.

The packet from the first computer is intercepted or acquired by the countermeasures apparatus 100. The countermeasures apparatus 100 determines whether this packet is a packet for installing the agent software, establishes a connection to the router if the packet is such a packet, and permits a communication. However, packets other than the packet using the HTTP protocol which is addressed to the distribution site described above (i.e., packets irrelevant to downloading of the agent software) are prohibited by the countermeasures apparatus 100 from being transferred to the router 14. Thus, the packets are blocked and discarded. The determination of the type of the packet may be performed based on data such as types of protocols and addresses of distribution sites.

Also, there is a case where the first computer applies for use of the subnetwork by obtaining agent software not through communication beyond the subnetwork but from a server within the subnetwork, and by executing the agent software. In this case, only a communication service which receives the agent software from the server is provided to the first computer. Here, it is preferable that other communication services be blocked, such as access to files saved in the server.

HTTP (hyper text transfer protocol) may be used as the communication protocol when the first computer obtains the agent software from the server within the subnetwork. The first computer requests that the server transmit the agent software. Therefore, for example, the countermeasures apparatus 100 may permit the first computer to transfer a packet, which uses the HTTP protocol and is addressed to a distribution server of the agent software, to the second computer (the distribution server of the agent software). However, packets other than this HTTP protocol packet addressed to the distribution server are blocked and discarded so that transfer of the packets to the second computer is prohibited.

The above description is not limited to the case of installation of agent software, but is applicable as well to a case of installing a virus definition file, for example. In this case, the countermeasures apparatus 100 permits only a communication service concerning a distribution site of the virus definition file (or a distribution server within the subnetwork) to update the virus definition file, and restricts other communication services. Also in this case, the first computer may use the HTTP protocol, and transmit a packet addressed to the distribution site (or the distribution server) of the virus definition file. The first determination means 105 of the countermeasures apparatus 100 determines the type of the packet based on the type of this protocol and destination information, and determines whether the packet is transferred or discarded.

A security patch may be installed. In this case, the countermeasures apparatus 100 permits only communication service concerning connection to a distribution site of the security patch (or a distribution server within the subnetwork) to update the security patch, and restricts other communication services. Also in this case, the first computer uses the HTTP protocol and transmits a packet addressed to the distribution site (or the distribution server) of the security patch. The first determination means 105 of the countermeasures apparatus 100 determines the type of the packet based on the protocol and destination information, and determines whether the packet is transferred or discarded. A command to start restrictions for update of the virus definition file and application of the security patch may be issued at an arbitrary time when the administrator of the subnetwork determines that these measures need to be taken.

In addition, as to prohibited software, a port number of prohibited software, which is transmitted to the second computer by the first computer, may be set as a determination index for the first determination means 105 to determine a packet. Without being limited to the prohibited software, a port number of a game or an application to be controlled can be set as a determination index for the first determination means 105 to determine a packet.

Figure 6:
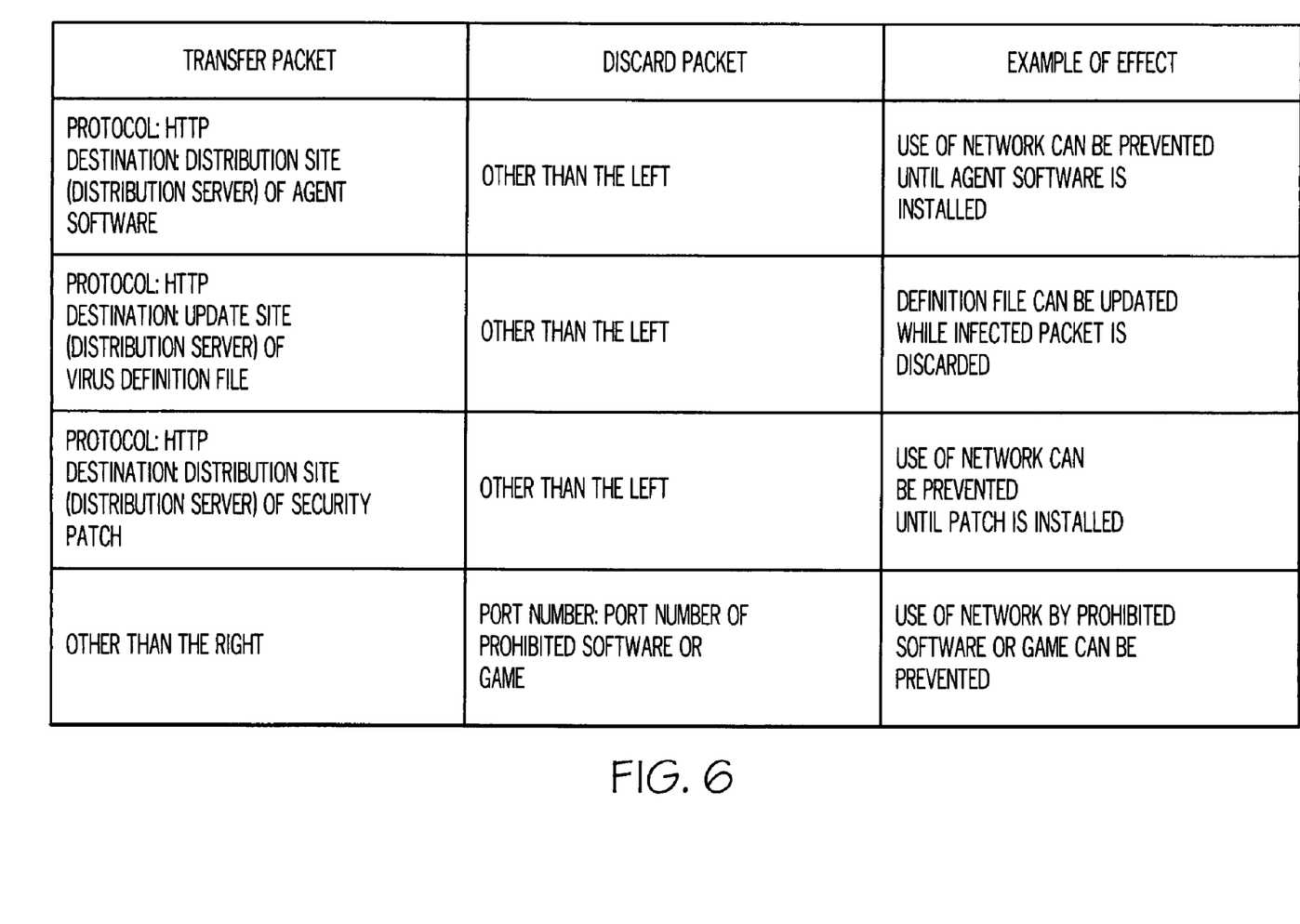
FIG. 6 is a table showing, for the case where a predetermined communication service is restricted, types of packets to be transferred or discarded and effects obtained by restricting the communication service.

FIG. 6 is a table showing packets to be transferred or discarded when a communication service is restricted as described above, and effects obtained by restricting the communication service. The communication services to be restricted as described above and the types of the packets to be determination indices are input from the first restriction-criteria input means 107. This input criteria data may be dynamically corrected and changed.

As an example, description will be given of a case where Linux (registered trademark) is used as an OS (operating system) of the countermeasures apparatus 100 and where an iptables command which comes with Linux is used for restricting a communication service. If only an HTTP is permitted to pass from the first computer to the second computer, the administrator receives input of restrictions on this communication service from the first restriction-criteria input means 107 and commands the first destination means 105 to restrict services other than the HTTP service by sending out a command as shown in Expression 1. Here, a number for dport is a well-known port number for TCT/IP. For example, if a packet is one concerning FTP, the number is designated as 21 as shown in Expression 2:

iptables-AFORWARD-ptcp-dport80-jACCEPT (Expression 1)

iptables-AFORWARD-ptcp-dport21-jACCEPT (Expression 2)

A method for controlling a communication service, as described according to the exemplary embodiment above, can be realized by a program executed by a computer or a server. A storage medium storing this program includes: an optical storage medium such as a DVD, a MD and a PD; a tape medium; a semiconductor memory; and the like. Moreover, the program may be provided through a network by using a storage device being a hard disk, a RAM or the like, which is provided in a server system connected to a dedicated communication network or the Internet, as the storage medium.

Although an exemplary embodiment of the present invention has been described above, the present invention is not particularly limited thereto. Moreover, the effects described in the embodiment of the present invention are listed as preferred effects achieved by the present invention. The effects of the present invention are not limited to those described in the exemplary embodiment of the present invention. According to the present invention, an apparatus or a method can be provided, which is capable of restricting a communication service of a computer to be controlled, the communication service being completed within a subnetwork without passing through a firewall, and which is capable of restricting the communication service of the computer to be controlled at an arbitrary time desired by an administrator without installation of a number of layer 3 switches and layer 7 switches into the subnetwork.

The present invention is not only capable of restricting a communication service between computers within a subnetwork but also is applicable to a communication service control system which restricts a communication service between computers connected through the Internet.

Although a preferred embodiment of the present invention has been described in detail, it should be understood that various changes, substitutions and alternations can be made therein without departing from spirit and scope of the inventions as defined by the appended claims.

We claim:

1. A method for restricting a communication service between a first computer and a second computer in a subnetwork via a countermeasures apparatus, comprising:
   a data input step for inputting restriction criteria stored in the countermeasures apparatus;
   a start command step for transmitting a set of restrictions including the restriction criteria to the first and second computers;
   a software agent request step using hypertext transfer protocol in a request packet including a distribution site address for requesting transmission of a software agent from a server beyond the subnetwork;
   a packet acquiring step for acquiring the request packet transmitted from the first computer before being received by the server beyond the network, the request packet acquired by the countermeasures apparatus;
   a step for converting a communication address of the second computer, stored in the first computer, into a communication address of the countermeasure apparatus, and for converting a communication address of the first computer, stored in the second computer, into the communication address of the countermeasure apparatus, in response to the set of restrictions in the start command step;

a first determination step for determining if the request packet is for installing the software agent based on the http protocol and distribution site address used in the software agent request step;

a second determination step for determining if the packet acquired in the packet acquiring step should be blocked and discarded according to the restriction criteria;

a first transmission step for transmitting the packet acquired from the first computer to the second computer if the packet acquired in the packet acquiring step is not blocked and discarded in the second determination step;

a receiving step for receiving a response packet by the countermeasures apparatus from the second computer upon execution of the first transmission step; and a second transmission step for transmitting the response packet from the countermeasure apparatus to the first computer.

2. A method for restricting a communication service as set forth in claim 1, further comprising:

a step wherein the first computer acquires the communication address of the second computer through ARP.

3. A method for restricting a communication service as set forth in claim 2, wherein
in the step for converting the communication address, the countermeasure apparatus sends either an ARP request or an ARP reply to the first computer and the second computer in response to the set of restrictions converting the communication address stored in the first computer by overwriting a MAC address of the second computer, stored in the first computer, with a MAC address of the countermeasure apparatus, and converting the communication address stored in the second computer by overwriting a MAC address of the first computer, stored in the second computer, with a MAC address of the countermeasure apparatus.

4. A method for restricting a communication service as set forth in claim 1, further comprising:

a second data inputting step for inputting a second restriction criteria stored in the countermeasures apparatus;

a restriction transmission step for transmitting a second set of restrictions including the second restriction criteria to the second computer based on receiving packet data input from the packet sent from the second computer to the first computer;

a controlling data storing step for storing a controlling packet data inputted in the second data inputting step, wherein the second transmission step for transmitting the response packet from the countermeasure apparatus to the first computer is determined based on the controlling packet data.

\* \* \* \* \*